United States Patent
Kishi et al.

(10) Patent No.: US 10,900,769 B2
(45) Date of Patent: Jan. 26, 2021

(54) THROTTLE DEVICE (71) Applicant: Toyo Denso Co., Ltd., Tokyo (JP)

(72) Inventors: Shoji Kishi, Saitama (JP); Toshiya Yoshida, Saitama (JP)

(73) Assignee: TOYO DENSO CO., LTD., Tokyo (JP)

( * ) Notice: Subject to any disclaimer, the term of this patent is extended or adjusted under 35 U.S.C. 154(b) by 57 days.

(21) Appl. No.: 16/133,055

(22) Filed: Sep. 17, 2018

(65) Prior Publication Data
US 2019/0094008 A1 Mar. 28, 2019

(30) Foreign Application Priority Data
Sep. 22, 2017 (JP) .................. 2017-182900

(51) Int. Cl.
| G01B 7/30 | (2006.01) |
| B62K 23/04 | (2006.01) |
| F02D 9/10 | (2006.01) |
| F02D 11/02 | (2006.01) |
| G01D 5/14 | (2006.01) |
| B62M 25/08 | (2006.01) |
| F02D 9/02 | (2006.01) |

(52) U.S. Cl.
CPC ............... *G01B 7/30* (2013.01); *B62K 23/04* (2013.01); *F02D 9/105* (2013.01); *F02D 11/02* (2013.01); *G01D 5/145* (2013.01); *B62M 25/08* (2013.01); *F02D 2009/0294* (2013.01)

(58) Field of Classification Search
CPC .......... G01B 7/30; B62K 23/04; F02D 9/105; F02D 11/02; F02D 2009/0294; G01D 5/145; B62M 25/08

USPC ............... 324/207.13, 207.2, 207.21, 207.25
See application file for complete search history.

(56) References Cited

U.S. PATENT DOCUMENTS

| 5,955,881 | A | * | 9/1999 | White | G01B 7/02 324/207.2 |
| 6,018,241 | A | * | 1/2000 | White | G01B 7/02 324/207.2 |
| 6,288,534 | B1 | * | 9/2001 | Starkweather | F02D 11/10 123/617 |
| 6,873,151 | B2 | * | 3/2005 | Lequesne | G01D 5/145 324/205 |

(Continued)

FOREIGN PATENT DOCUMENTS

| DE | 102018216046 A1 * | 5/2019 | ............. B62K 23/04 |
| JP | 4552698 B2 | 7/2010 | |

(Continued)

*Primary Examiner* — Patrick Assouad
*Assistant Examiner* — Sean Curtis
(74) *Attorney, Agent, or Firm* — Lucas & Mercanti, LLP (57) ABSTRACT

A grip, a magnet 140, and a substrate 150 are included. The grip is rotatable between positions where a throttle is fully closed and a position where the throttle is fully open with a rotating shaft as a center. The magnet 140 rotates integrally with the grip. The substrate 150 includes a plurality of Hall elements 165 and 175, and is fixed to face the magnet 140. The plurality of Hall elements 165 and 175 are disposed in such a way that magnetic flux densities different from each other are respectively applied to the plurality of Hall elements 165 and 175 when an external magnetic field acts in a state where the grip is located in the position where the throttle is fully closed.

9 Claims, 10 Drawing Sheets

(56) References Cited

U.S. PATENT DOCUMENTS

| | | | | |
|---|---|---|---|---|
| 6,946,831 B2* | 9/2005 | Miyata | ................ | F02D 9/105 123/617 |
| 7,034,525 B2* | 4/2006 | Mizutani | ................ | G01D 5/142 324/207.24 |
| 7,071,683 B2* | 7/2006 | Shimomura | ............ | G01D 5/145 324/207.2 |
| 7,161,349 B2* | 1/2007 | Itoh | ................ | G01D 5/145 324/207.2 |
| 7,622,913 B2* | 11/2009 | Kogure | ................ | G01D 5/145 324/207.25 |
| 7,994,774 B2* | 8/2011 | Thomas | ................ | G01D 3/021 324/207.2 |
| 8,106,649 B2* | 1/2012 | Kaita | ................ | G01D 5/2449 324/207.25 |
| 8,258,782 B2* | 9/2012 | Kaita | ................ | G01B 7/30 324/207.25 |
| 8,441,252 B2* | 5/2013 | Suzuki | ................ | G01D 5/145 324/207.21 |
| 8,587,295 B2* | 11/2013 | Aimuta | ................ | G01D 5/145 324/207.24 |
| 9,242,557 B2* | 1/2016 | Watanabe | ............ | B60K 26/02 |
| 9,448,054 B2* | 9/2016 | Nomura | ............ | F02D 9/105 |
| 10,215,550 B2* | 2/2019 | Metivier | ................ | G01B 7/30 |
| 10,267,870 B2* | 4/2019 | Cosgrave | ............ | G01R 33/096 |
| 10,309,803 B2* | 6/2019 | Cosgrave | ............ | G01D 5/24461 |
| 10,578,420 B2* | 3/2020 | Yoshiya | ................ | G01B 7/30 |
| 2004/0061495 A1* | 4/2004 | Shimomura | ............ | G01D 5/145 324/207.25 |
| 2004/0085062 A1* | 5/2004 | Miyata | ................ | F02D 11/106 324/207.2 |
| 2004/0251896 A1* | 12/2004 | Mizutani | ................ | G01D 5/142 324/207.25 |
| 2005/0007104 A1* | 1/2005 | Lequesne | ................ | G01D 5/145 324/207.25 |
| 2006/0202679 A1* | 9/2006 | Kogure | ................ | G01D 5/145 324/207.11 |
| 2006/0261804 A1* | 11/2006 | Itoh | ................ | G01D 5/145 324/207.25 |
| 2010/0007340 A1* | 1/2010 | Kaita | ................ | G01D 5/145 324/207.25 |
| 2010/0026282 A1* | 2/2010 | Kaita | ................ | G01B 7/30 324/207.25 |
| 2011/0238367 A1* | 9/2011 | Matsumoto | ............ | G01D 5/145 702/151 |
| 2012/0038348 A1* | 2/2012 | Aimuta | ................ | G01D 5/145 324/207.24 |
| 2013/0257416 A1* | 10/2013 | Nomura | ................ | B62K 23/04 324/207.13 |
| 2013/0293220 A1* | 11/2013 | Metivier | ................ | G01B 7/30 324/207.2 |
| 2014/0145713 A1* | 5/2014 | Watanabe | ............ | B60K 26/02 324/207.25 |
| 2018/0372475 A1* | 12/2018 | Yoshiya | ................ | G01B 7/30 |
| 2018/0372509 A1* | 12/2018 | Yoshiya | ................ | G01D 5/145 |
| 2019/0094008 A1* | 3/2019 | Kishi | ................ | B62K 23/04 |

FOREIGN PATENT DOCUMENTS

| | | | | |
|---|---|---|---|---|
| JP | 4552698 B2 * | 9/2010 | | |
| JP | 5961414 B2 | 7/2016 | | |
| JP | 5961414 B2 * | 8/2016 | ............ | F02D 11/02 |
| JP | 2019060238 A * | 4/2019 | ............ | F02D 11/02 |

* cited by examiner

First position (throttle is fully closed)

FIG. 4

Second position (throttle is fully open)

THROTTLE DEVICE

CROSS-REFERENCE TO RELATED APPLICATION

This application is based upon and claims the benefit of priority from the corresponding Japanese Patent Application No. 2017-182900, filed Sep. 22, 2017, the entire contents of which are incorporated herein by reference.

BACKGROUND

1. Technical Field

The present invention relates to a throttle device that can avoid the abnormal detection of a throttle opening.

2. Description of Related Arts

In recent years, the detection of the throttle opening of a vehicle such as a motorcycle has been shifting from mechanical detection using a wire to electronic detection using a magnetic sensor.

As an example, in the magnetic detection device described in the description of Japanese Patent No. 4552698, a magnet is provided that rotates according to the rotation of an object to be detected, and two magnetic sensors are disposed in positions where the directions of vectors are same and intensities thereof are different from each other, with respect to the magnet. The throttle opening is detected using signals of these magnetic sensors.

In the throttle opening detection device described in the description of Japanese Patent No. 5961414, a Halbach array magnet is used, and magnetic sensors are disposed in an axial direction of a rotor. Similarly to Japanese Patent No. 4552698, the throttle opening is detected using signals of these magnetic sensors.

However, when the throttle opening is electronically detected, the throttle opening may be erroneously detected due to an influence of a disturbance magnetic field. As an example, when a health appliance or a magnetotherapeutic device, such as a bracelet, a necklace, or ELEKIBAN (registered trademark), that is worn by a rider and that a magnet is built in approaches a throttle device, a magnetic field detected by the magnetic sensor is disturbed due to an influence of the magnet described above. This may result in the erroneous detection of the throttle opening.

In the magnetic detection device described in Japanese Patent No. 4552698, a difference between detection signals of two Hall elements is output so that a detected throttle opening is not affected by the disturbance magnetic field.

In this method, only an influence of the disturbance magnetic field that is located in a remote position is canceled, and this method is not effective for a strong magnetic field that is located at a short distance.

In the throttle opening detection device described in Japanese Patent No. 5961414, a plurality of magnetic sensors are used, and a difference among the outputs of the plurality of magnetic sensors is calculated. When an abnormality has been found, whether each of the plurality of magnetic sensors has failed is determined.

In this method, an abnormality due to the failure of the magnetic sensor can be determined, but an abnormality due to the disturbance magnetic field fails to be determined.

The present invention has been made to solve the problems described above in the prior art, and an object of the present invention is to provide a throttle device that can avoid the abnormal detection of a throttle opening even under an influence of a disturbance magnetic field.

SUMMARY

In order to achieve the object described above, a throttle device according to the present invention includes a rotating body, a magnet, and a substrate. The rotating body is rotatable between a first position and a second position with a rotating shaft as a center. The magnet rotates integrally with the rotating body. The substrate includes a plurality of magnetic sensors and is fixed to face the magnet. The plurality of magnetic sensors are disposed in such a way that magnetic flux densities different from each other are respectively applied to the plurality of magnetic sensors when an external magnetic field acts in a state where the rotating body is located in the first position.

In the throttle device according to the present invention, when the external magnetic field acts in a state where the rotating body is located in the first position, magnetic flux densities different from each other are respectively applied to the plurality of magnetic sensors. Therefore, it becomes easy to sense the erroneous detection of a grip position when the rotating body is located in the first position, and the abnormal detection of a throttle opening can be reliably avoided.

In addition, in the throttle device according to the present invention, the erroneous detection of the grip position due to the disturbance magnetic field can be sensed without providing a special part.

Further, in the throttle device according to the present invention, a physical distance or a cover does not need to be provided in order to avoid an influence of the disturbance magnetic field. Thus, restrictions on the physical constitution of the throttle device can be eliminated, a degree of freedom in the design of the throttle device increases, and the size of the throttle device can be reduced.

DETAILED DESCRIPTION

Figure 1:
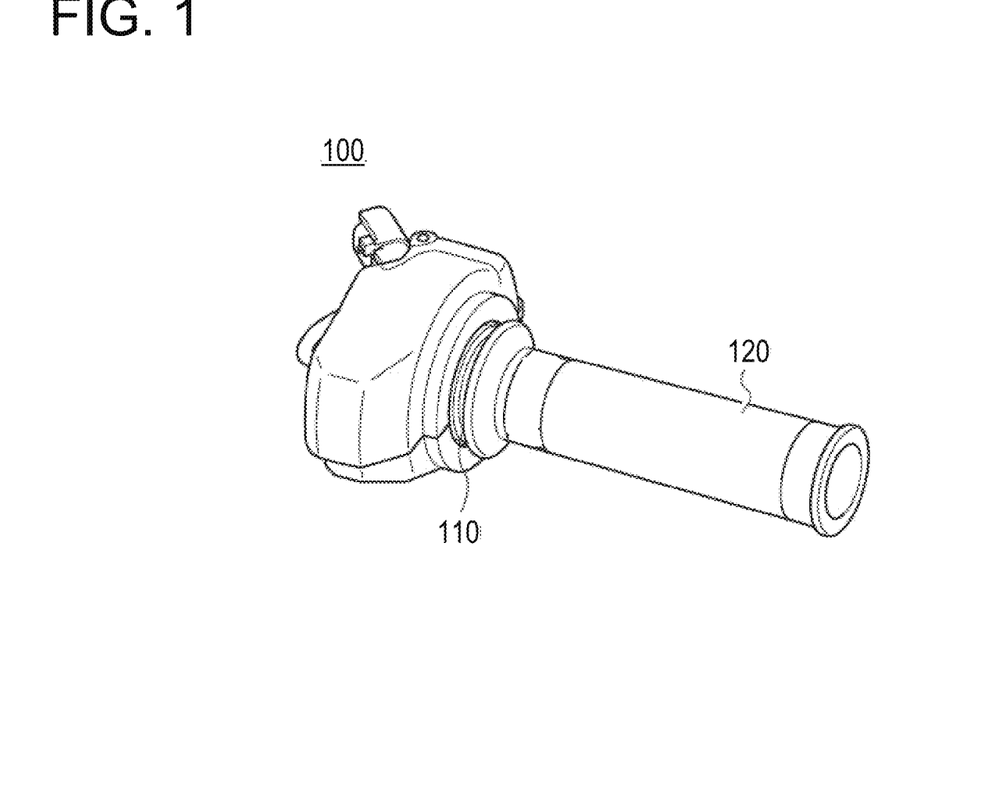
FIG. 1 is a perspective view of a throttle device according to first and second embodiments.
Figure 2:
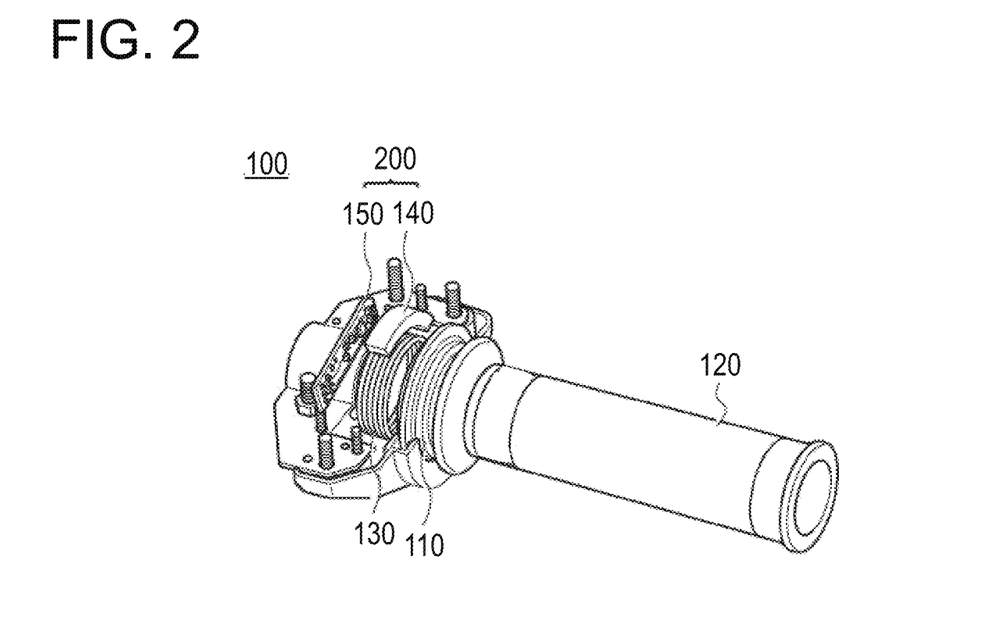
FIG. 2 is a partially broken perspective view of the throttle device illustrated in FIG. 1.

Next, embodiments of a throttle device according to the present invention are described by separately describing a first embodiment and a second embodiment. FIG. 1 is a perspective view of the throttle device according to the first and second embodiments. FIG. 2 is a partially broken perspective view of the throttle device illustrated in FIG. 1.

First Embodiment (Mechanical Configuration of Throttle Device)

The throttle device 100 illustrated in FIG. 1 is attached on a right side of a handlebar of a motorcycle. A grip 120 that is a rotating body is attached to a rotating shaft 110 of the throttle device 100. The grip 120 is rotatable between a first position and a second position with the rotating shaft 110 as a center.

The first position refers to a position to which the grip 120 naturally returns, and is a grip position in which a throttle is fully closed. When a rider of the motorcycle is not operating the grip 120, the grip position is located in the first position, and an engine of the motorcycle is in an idle state.

The second position is a position where the grip 120 is rotated to a position in which the grip 120 cannot be further rotated, and is a grip position in which the throttle is fully open. When the rider of the motorcycle operates the grip 120 to rotate the grip 120 to the second position, the engine of the motorcycle is in a state in which an output is increasing to a maximum output.

As illustrated in FIG. 2, a return spring 130, a magnet 140, and a substrate 150 are provided inside the throttle device 100.

The return spring 130 is connected to the grip 120, and applies a returning energizing force to the grip 120. When the rider releases their hand from the grip 120 and stops an operation to rotate the grip 120, the grip 120 is returned to the first position due to the energizing force of the return spring 130.

The magnet 140 is coupled with the grip 120, and rotates integrally with the grip 120. In rotating, the magnet 140 rotates along an outer periphery of the return spring 130. The magnet 140 is a segment (C) type magnet having an arc shape. Both ends in a longitudinal direction of the magnet 140 are magnetized into an N pole and an S pole.

The substrate 150 includes a plurality of magnetic sensors, and is fixed to face the magnet 140. Examples of the magnetic sensor include a Hall element, a magnetoresistive element, a magnetic impedance element, and a superconductive quantum interference element. In the first embodiment, the Hall element is used as the magnetic sensor. The Hall element is inexpensive and easily available as the magnetic sensor to be used in the throttle device 100. Of course, the magnetoresistive element, the magnetic impedance element, or the superconductive quantum interference element may be used as the magnetic sensor. The magnet 140 and the substrate 150 form an accelerator position sensor (APS) 200.

Figure 3:
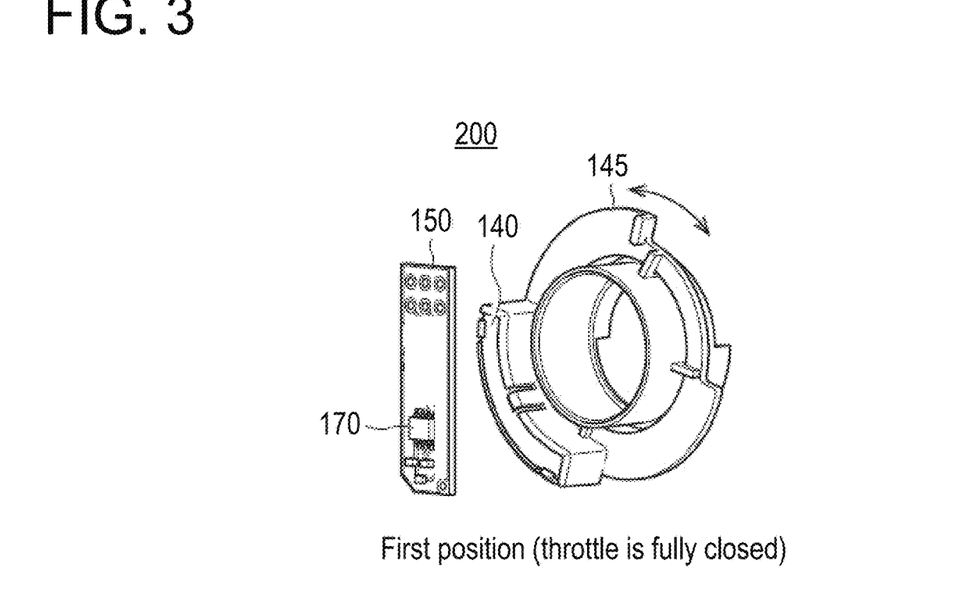
FIG. 3 schematically illustrates a positional relationship between a magnet and a substrate in a first position of a grip illustrated in FIG. 2.
Figure 4:
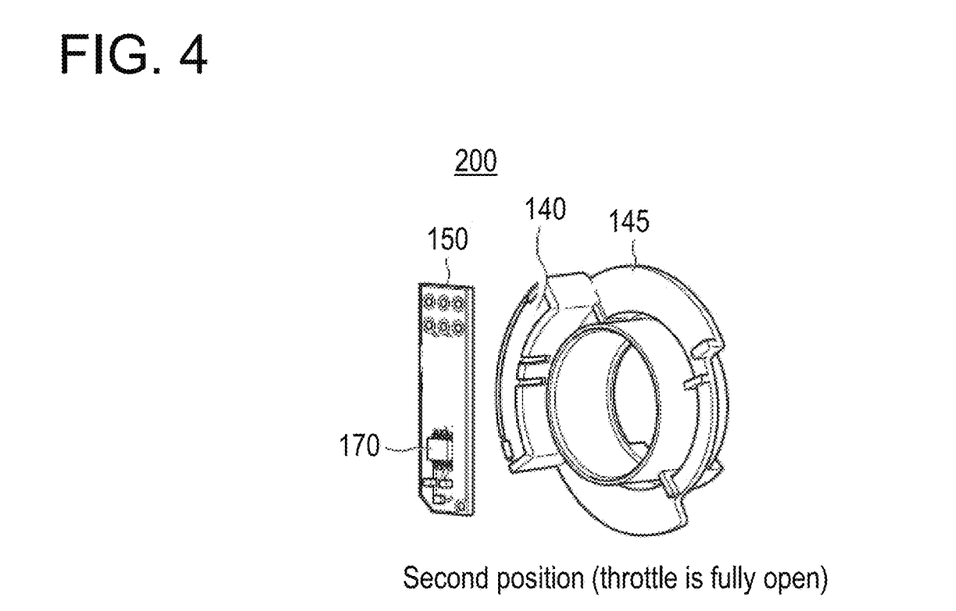
FIG. 4 schematically illustrates a positional relationship between the magnet and the substrate in a second position of the grip illustrated in FIG. 2.
Figure 5:
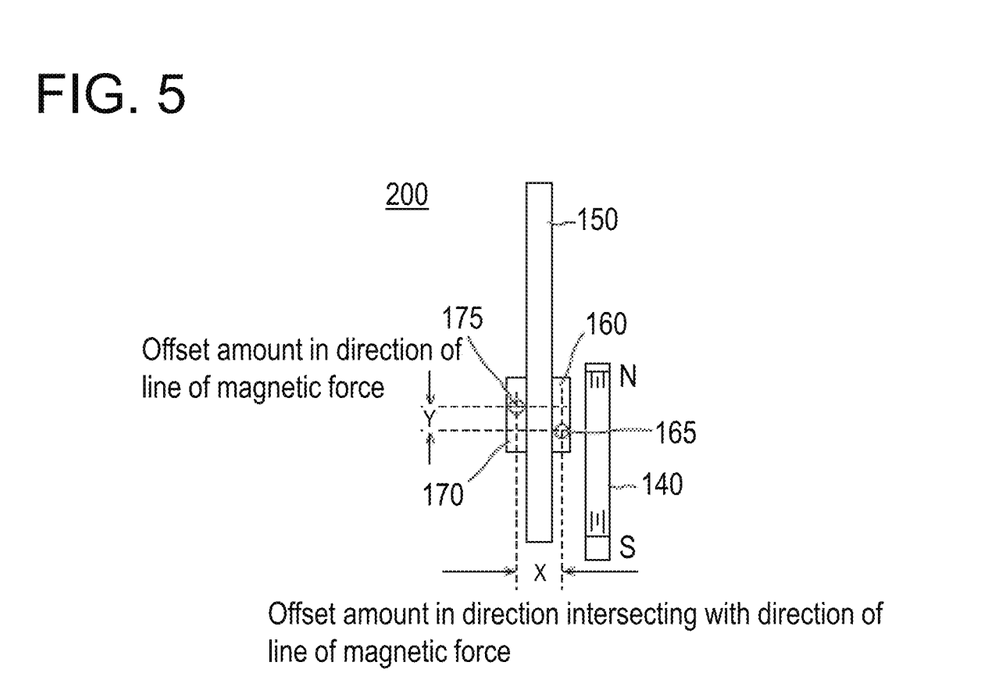
FIG. 5 illustrates a positional relationship between the magnet and Hall elements in an accelerator position sensor (APS) illustrated in FIGS. 3 and 4.

FIG. 3 schematically illustrates a positional relationship between the magnet and the substrate in the first position of the grip illustrated in FIG. 2. FIG. 4 schematically illustrates a positional relationship between the magnet and the substrate in the second position of the grip illustrated in FIG. 2. FIG. 5 illustrates a positional relationship between the magnet and the Hall elements in the accelerator position sensor (APS) illustrated in FIGS. 3 and 4.

As illustrated in FIGS. 3 and 4, the magnet 140 is housed in a magnet holder 145. The magnet holder 145 is attached to one end of the grip 120 (see FIG. 2) coaxially with the rotating shaft of the grip 120. When the grip 120 rotates, the magnet holder 145 rotates interlockingly in a direction illustrated by an arrow in FIG. 3.

The substrate 150 is fixedly attached in a housing (not illustrated) of the throttle device 100 (see FIG. 2). Accordingly, the magnet 140 rotates along a surface of the fixed substrate 150. As illustrated in FIG. 5, two Hall ICs 160 and 170 are attached to the substrate 150. The Hall IC 160 is provided on a surface on a side of the magnet of the substrate 150, and the Hall IC 170 (also illustrated in FIGS. 3 and 4) is provided on a surface opposite to the surface on the side of the magnet.

As illustrated in FIG. 3, when the grip 120 is located in the first position in which the throttle is fully closed, the Hall IC 160 (see FIG. 5) and the Hall IC 170 face a side of one magnetic pole (for example, the N pole) of the magnet 140.

As illustrated in FIG. 4, when the grip 120 is located in the second position in which the throttle is fully open, the magnet 140 has rotated from the position of FIG. 3, and the Hall IC 160 (see FIG. 5) and the Hall IC 170 face a side of the other magnetic pole (for example, the S pole) of the magnet 140.

As illustrated in FIG. 5, a Hall element 165 is provided in the Hall IC 160, and a Hall element 175 is provided in the Hall IC 170. As described above, the Hall element 165 and the Hall element 175 are fixed to the substrate 150 so as to face the magnet 140.

The Hall element 165 and the Hall element 175 are respectively provided on a front surface and a reverse surface of the substrate 150. The Hall element 165 and the Hall element 175 are disposed such that magnetic flux densities different from each other are applied to the Hall element 165 and the Hall element 175 respectively when an external magnetic field (for example, a strong magnetic field) acts in a state in which the grip 120 is located in the first position in which the throttle is fully closed. Specifically, the Hall element 165 and the Hall element 175 are disposed so as to be mutually offset in two directions such that the magnitude of a magnetic field applied from the magnet 140 is different between the Hall element 165 and the Hall element 175. The two directions are a direction of a line of magnetic force of the magnetic field (a vertical direction on a page of FIG. 5), and a direction intersecting with the direction of the line of magnetic force (a horizontal direction on the page of FIG. 5). By disposing the Hall elements 165 and 175 as described above, the Hall element 175 is affected more greatly by the external magnetic field than the Hall element 165. When the external magnetic field acts on the Hall element 165 and the Hall element 175, an output of the Hall element 175 greatly changes.

Offsetting the Hall element 165 and the Hall element 175 in the direction of the line of magnetic force of the magnetic field corresponds to making the positions of the Hall element 165 and the Hall element 175 different from each other on a plane of the substrate 150. Offsetting the Hall element 165 and the Hall element 175 in the direction intersecting with the direction of the line of magnetic force corresponds to disposing the Hall element 165 and the Hall element 175 on the front surface and the reverse surface of the substrate 150, respectively, so as to make the positions of the Hall element 165 and the Hall element 175 different from each other by using the thickness of the substrate 150.

As illustrated in FIG. 5, an offset amount between the Hall element 165 and the Hall element 175 in the direction of the line of magnetic force is Y, and an offset amount between the Hall element 165 and the Hall element 175 in the direction intersecting with the direction of the line of magnetic force is X. Positions in which the Hall IC 160 and the Hall IC 170 are attached are adjusted in a design stage such that, in practice, these offset amounts X and Y are achieved by only attaching the Hall IC 160 and the Hall IC 170 to the substrate 150.

As described above, by disposing the Hall element 165 and the Hall element 175 so as to have the offset amounts X and Y, it becomes easy to sense the erroneous detection of the grip position when the grip 120 (see FIG. 2) is located in the first position.

It is easy to sense the erroneous detection when the grip 120 is located in the first position, because the two Hall elements 165 and 175 have a difference in a direction and an intensity of a magnetic flux applied from the magnet 140, the two Hall elements 165 and 175 are likely to also have a difference in a direction and an intensity of a magnetic flux applied from the external magnetic field, the outputs of the two Hall elements immediately have a difference that is greater than or equal to a threshold, and therefore it can be easily detected that the external magnetic field has acted on the Hall element 165 and the Hall element 175. Thus, the disposition of sensors is employed that easily generates the difference in the magnetic flux density (an output voltage) between the Hall element 165 and the Hall element 175 that have certain output characteristics when an external strong magnetic field is generated (particularly, in the first position). This output difference when a disturbance occurs, is generated regardless of a normal output difference (the output characteristics).

The Hall IC 160 and the Hall IC 170 that are attached to the substrate 150 are integrated circuits that process the outputs of the Hall element 165 and the Hall element 175 that are respectively included in the Hall IC 160 and the Hall IC 170. The output characteristics of the Hall IC 160 and the Hall IC 170 are different from each other in accordance with the respective characteristics of the Hall element 165 and the Hall element 175, as described later. The outputs of the Hall element 165 and the Hall element 175 that have been processed by the Hall IC 160 and the Hall IC 170 are output to an engine control unit (ECU) included in a motorcycle body.

Figure 6:
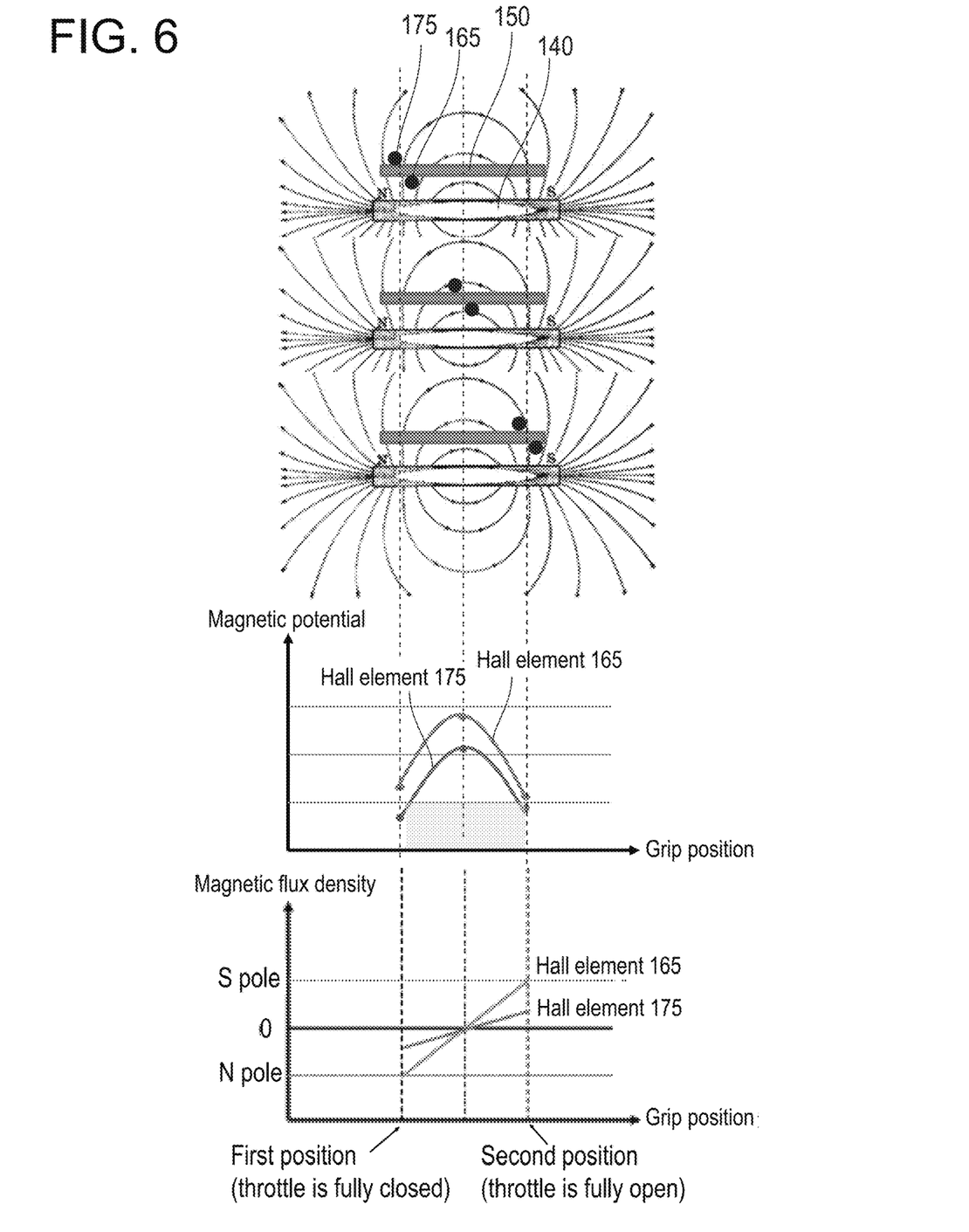
FIG. 6 is a diagram for explaining a change in a magnetic potential and a magnetic flux density that are applied to two Hall elements while the grip illustrated in FIG. 2 rotates from the first position to the second position.

FIG. 6 is a diagram for explaining a change in a magnetic potential and a magnetic flux density that are applied to the two Hall elements while the grip illustrated in FIG. 2 rotates from the first position to the second position.

As illustrated in FIG. 6, a relative positional relationship between the magnet 140 and the substrate 150 changes according to the movement of the grip position from the first position (the throttle is fully closed) to the second position (the throttle is fully open). Accordingly, a relative positional relationship between the magnet 140, and the Hall elements 165 and 175 also changes, as illustrated in FIG. 6.

Changes in the magnetic potential of the Hall element 165 and the Hall element 175 while the grip position moves from the first position to the second position form parabolas have an upward convex shape, as illustrated in FIG. 6. A change in a magnetic flux density that is applied to the Hall element 165 while the grip position moves from the first position to the second position is greater than a change in the magnetic flux density that is applied to the Hall element 175, as illustrated in FIG. 6.

When the external magnetic field acts on the Hall element 165 and the Hall element 175, the magnetic flux densities that are applied to the Hall element 165 and the Hall element 175 have a big difference, in particular, in the first position. Therefore, when a threshold having an appropriate value is set in order to detect that the external magnetic field has acted, it is easy to detect that the external magnetic field has acted on the Hall element 165 and the Hall element 175. As a result, it becomes easy to sense the erroneous detection of the grip position when the grip is in the first position, and the abnormal detection of the throttle opening can be reliably avoided.

(Configuration of Control System of the Throttle Device)

Figure 7:
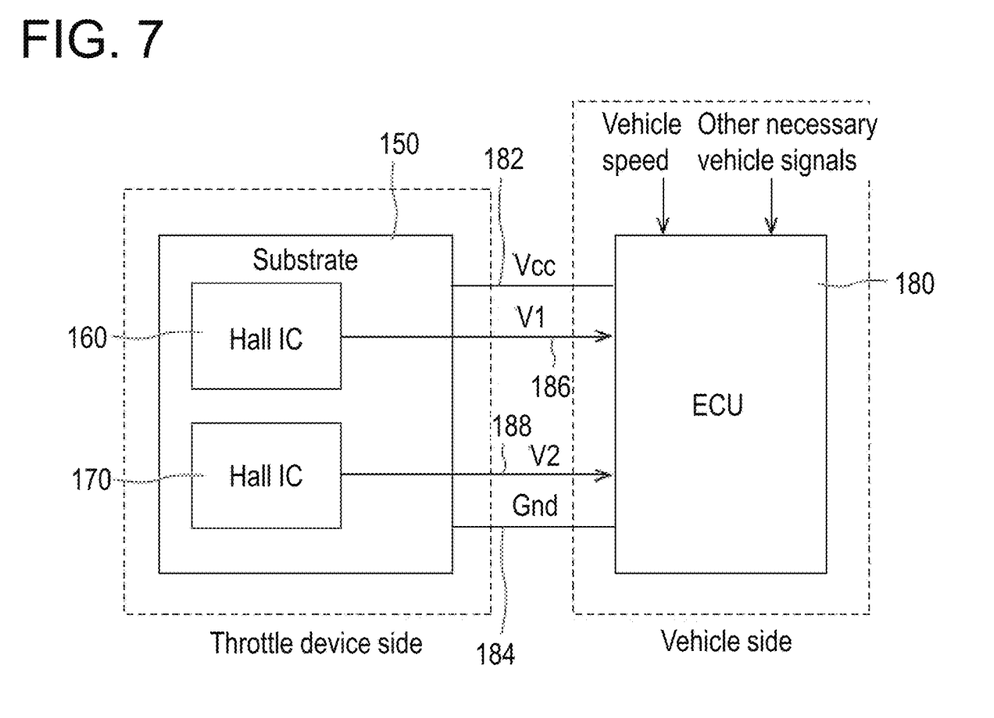
FIG. 7 is a block diagram of control systems on a throttle device side and a vehicle side according to the first embodiment.

FIG. 7 is a block diagram of control systems on the throttle device side and the vehicle side according to the first embodiment.

As illustrated in FIG. 7, the substrate 150 is provided on the throttle device side, and the engine control unit (ECU) 180 is provided on the vehicle side. The substrate 150 and the ECU 180 are connected by a power supply line 182, a ground wire 184, and signal lines 186 and 188. A power supply voltage Vcc is supplied from the ECU 180 to the substrate 150 via the power supply line 182 and the ground wire 184.

The Hall IC 160 and the Hall IC 170 are provided in the substrate 150. The Hall IC 160 is connected to the ECU 180 via the signal line 186, and the Hall IC 170 is connected to the ECU 180 via the signal line 188. The Hall IC 160 amplifies an output of the Hall element 165, and outputs a signal V1 after amplification to the ECU 180. The Hall IC 170 amplifies an output of the Hall element 175, and outputs a signal V2 after amplification to the ECU 180.

Figure 8:
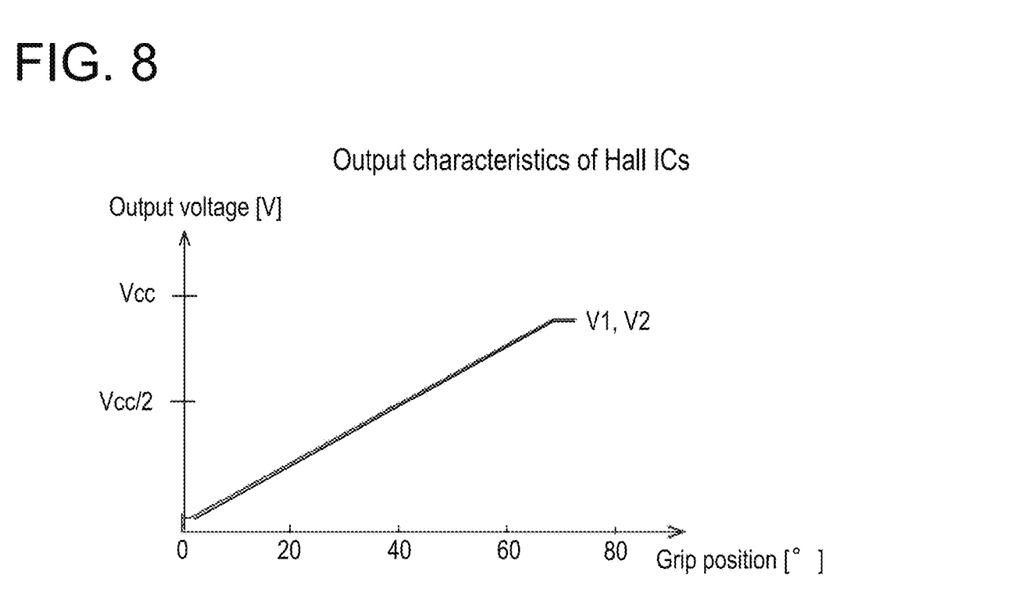
FIG. 8 illustrates output characteristics of two Hall ICs illustrated in FIG. 7.

FIG. 8 illustrates output characteristics of the two Hall ICs illustrated in FIG. 7. As illustrated in FIG. 8, the Hall IC 160 and the Hall IC 170 have a characteristic whereby the respective output voltages linearly increase in proportion to the grip position.

The Hall element 165 (see FIG. 5) included in the Hall IC 160 is a magnetic sensor that directly faces the magnet 140. The Hall element 175 included in the Hall IC 170 is a magnetic sensor that indirectly faces the magnet 140 via the substrate 150.

The Hall element 165 and the Hall element 175 are disposed to be offset, as illustrated in FIG. 5, so that the magnetic flux densities that are different from each other are applied to the Hall element 165 and the Hall element 175 according to the grip position, as illustrated in FIG. 6. Therefore, an amplification factor of an amplifier (not illustrated) incorporated into the Hall IC 160 is set to be different from an amplification factor of an amplifier (not illustrated) incorporated into the Hall IC 170, so that the Hall IC 160 and the Hall IC 170 output the same output voltage in the same grip position, as illustrated in FIG. 8. The output voltages of the Hall IC 160 and the Hall IC 170 may be set to be the same level on the ECU 180 side rather than on the Hall ICs side as in the present embodiment. In other words, the Hall IC 160 and the Hall IC 170 do not always have the same output characteristics, and the output characteristics may change at (constant) ratios different from each other.

Figure 9:
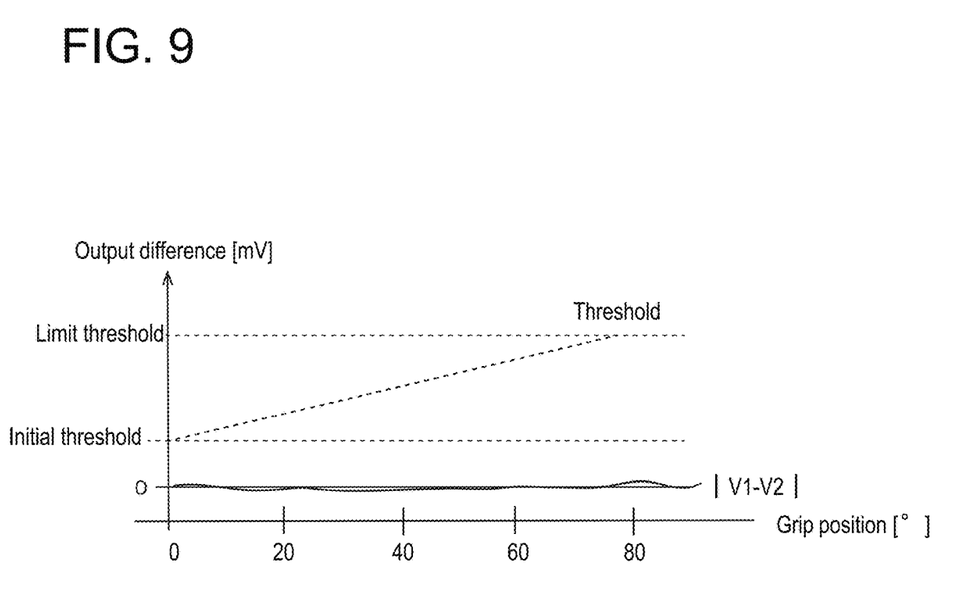
FIG. 9 illustrates a relationship between an output difference between Hall ICs and a threshold during a normal period during which a grip position is accurately detected.

FIG. 9 illustrates a relationship between an output difference between the Hall ICs and a threshold during a normal period during which the grip position is accurately detected.

During the normal period during which the external magnetic field does not act, voltages that are input from the substrate 150 to the ECU 180 via the signal lines 186 and 188 are V1, which is output from the Hall IC 160, and V2, which is output from the Hall IC 170. In ECU 180, V1−V2 is calculated, as illustrated in FIG. 9, and the output difference is obtained. During the normal period, the output difference is almost 0 regardless of the grip position.

The ECU 180 stores the threshold such that the ECU 180 can detect an abnormal period during which the external magnetic field acts and the grip position is erroneously detected. The threshold is set to correspond to the grip position and to continuously or gradually increase from the first position to the second position in at least a portion between the first position and the second position. The threshold has a minimum value when the grip position is located in the first position. In the first embodiment, the threshold linearly increases from an initial threshold to a limit threshold, as illustrated with a dotted line in FIG. 9.

By setting the threshold to a minimum when the grip position is located in the first position and setting the threshold to continuously or gradually increase according to the movement of the grid position from the first position to the second position, it becomes easy to sense the erroneous detection of the grip position when the grip position is located near the first position. As a result, the abnormal detection of the throttle opening can be reliably avoided. In other words, a situation can be avoided in which, when the engine is in the idling state, by being affected by the external magnetic field so that the engine suddenly rotates at high speed.

Figure 10:
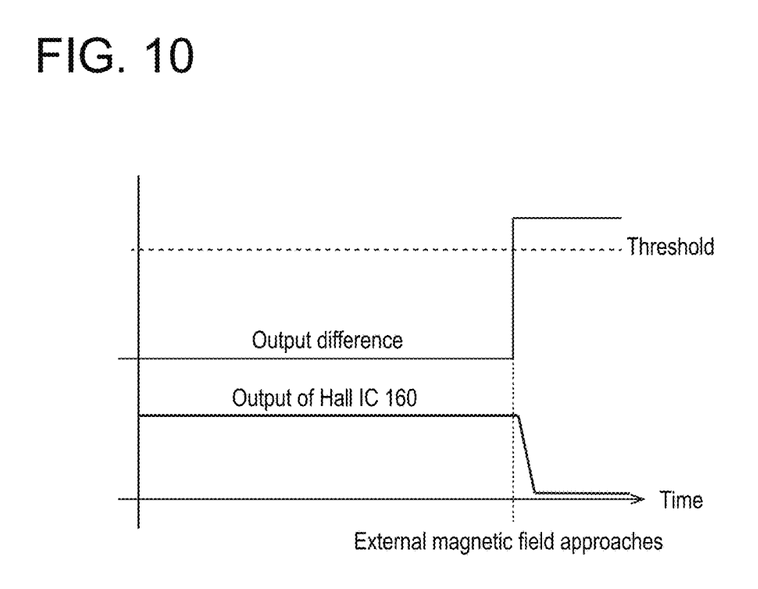
FIG. 10 illustrates a relationship between the output difference between the Hall ICs and the threshold during an abnormal period during which the grip position is erroneously detected.

FIG. 10 illustrates a relationship between the output difference between the Hall ICs and the threshold during the abnormal period during which the grip position is erroneously detected.

As illustrated in the drawing, when the external magnetic field approaches, the external magnetic field acts on the Hall elements 165 and 175 (see FIG. 5), and the position of the magnet 140 cannot be accurately detected. In other words, the grip position fails to be accurately grasped. The ECU 180 calculates the output difference V1−V2 between the Hall IC 160 and the Hall IC 170. When the output difference exceeds the threshold that is set in advance, the ECU 180 determines that the grip position has not been accurately detected, forcibly reduces the output of the Hall IC 160 to be lower than a current output, and sets the output to be at the LOW level. The ECU 180 also considers that the grip position is located in the first position, and sets the engine to the idling state.

(Operation of Throttle Device)

Figure 11:
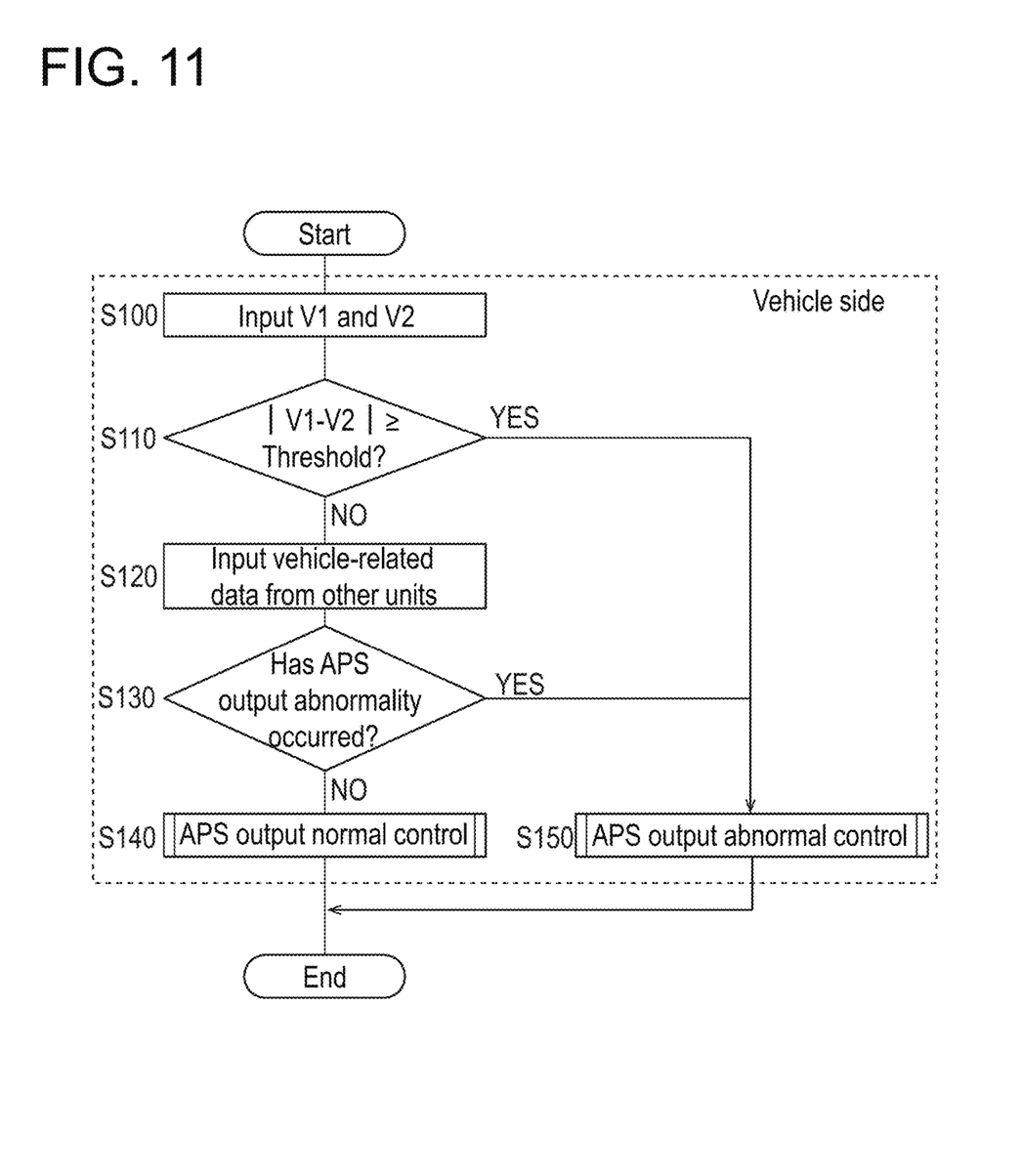
FIG. 11 is an operation flowchart of an engine control unit (ECU) illustrated in FIG. 7.

FIG. 11 is an operation flowchart of the engine control unit (ECU) illustrated in FIG. 7. An operation procedure of this operation flowchart is described with reference to FIG. 7.

First, V1 and V2 are input to the ECU 180 from the substrate 150, as illustrated in FIG. 7 (S100). The ECU 180 calculates an absolute value of the difference between V1 and V2, and determines whether the absolute value is greater than or equal to the threshold (S110).

As a result of the determination above, when the absolute value is less than the threshold (S110: NO), vehicle-related data is input to the ECU 180 from other units (S120). As an example, the ECU 180 is input, as the vehicle-related data, vehicle speed and other necessary vehicle signals (such as oil temperature, a seating state, or a state of a side stand), as illustrated in FIG. 7.

The ECU 180 determines whether an accelerator position sensor (APS) output abnormality has occurred on the basis of each of V1, V2, the vehicle speed, and the other necessary vehicle signals that have been input (S130). The APS output abnormality refers to a state in which the grip position fails to be accurately recognized.

When the APS output abnormality has not occurred (S130: NO), the ECU 180 performs APS output normal control (S140). The APS output normal control will be described with reference to the subroutine flowchart of FIG. 12.

When it is determined in step S110 that the absolute value of the difference between V1 and V2 is greater than or equal to the threshold (S110: YES) or when it is determined in step S130 that the APS output abnormality has occurred (S130: YES), the ECU 180 performs APS output abnormal control (S150). The APS output abnormal control will be described with reference to the subroutine flowchart of FIG. 13.

Figure 12:
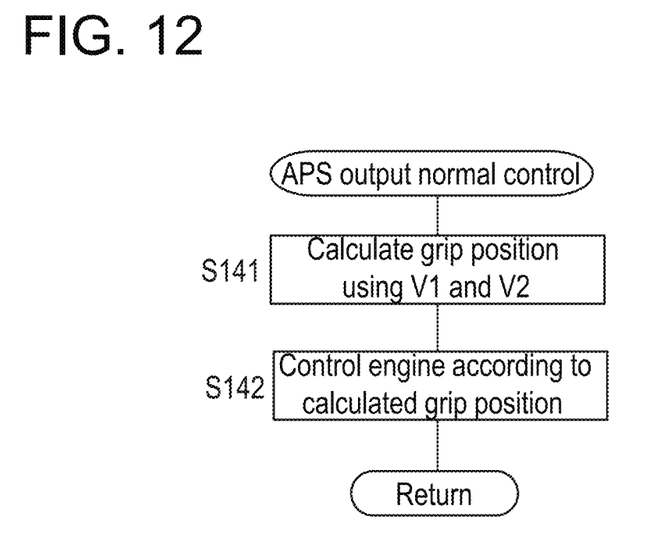
FIG. 12 is a subroutine flowchart illustrating the process of step S140 in FIG. 11.

FIG. 12 is a subroutine flowchart illustrating the process of step S140 in FIG. 11.

When the APS output abnormality has not occurred, V1 and V2 are input to the ECU 180 from the substrate 150, and calculates the grip position by using V1 and V2 (S141). In the first embodiment, the grip position is calculated by using either V1 or V2. In the first embodiment, a disturbance-period abnormality detecting function is implemented by using the two Hall elements 165 and 175 that are used to determine a failure. Then, the ECU 180 controls the engine of the vehicle in accordance with the calculated grip position (S142).

Figure 13:
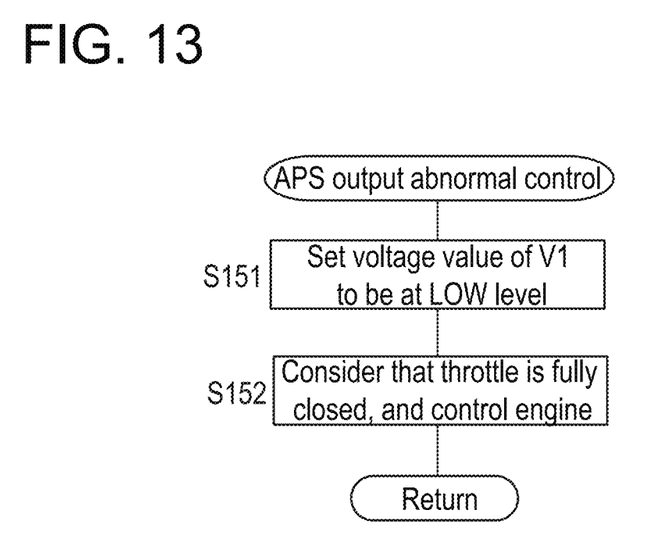
FIG. 13 is a subroutine flowchart illustrating the process of step S150 in FIG. 11.

FIG. 13 is a subroutine flowchart illustrating the process of step S150 in FIG. 11.

When the APS output abnormality has occurred, the ECU 180 reduces a voltage value of V1 that has been input from the substrate 150, and sets the voltage value to be at the LOW level, as illustrated in FIG. 10 (S151). Then, the ECU 180 considers that the grip position is located in a position in which the throttle is fully closed, and controls the engine of the vehicle (S152). In other words, the ECU 180 considers that the grip position is located in the first position regardless of the magnitudes of the output voltages V1 and V2, and controls the engine to enter into the idle state.

As described above, by employing the throttle device 100 according to the first embodiment, in particular, when the throttle position is located in the first position, the erroneous detection of the grip position can be easily sensed, so that the abnormal detection of the throttle opening can be reliably avoided.

Second Embodiment (Mechanical Configuration of Throttle Device)

A mechanical configuration is the same as the mechanical configuration illustrated in FIGS. 1 to 6 of the throttle device 100 according to the first embodiment.

(Configuration of Control System of Throttle Device)

A configuration of the control system of the throttle device according to the second embodiment is different from the configuration of the control system of the throttle device 100 according to the first embodiment in that an abnormality detector and amplifiers are included.

Figure 14:
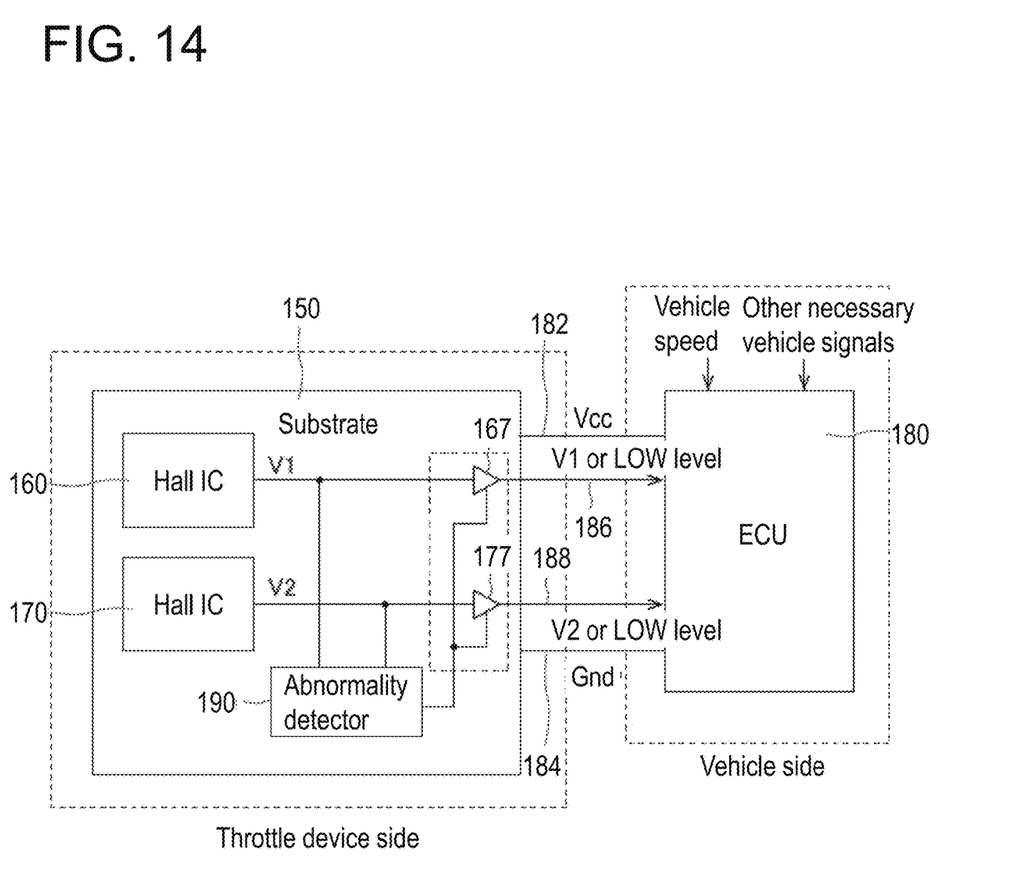
FIG. 14 is a block diagram of control systems on a throttle device side and a vehicle side according to the second embodiment.

FIG. 14 is a block diagram of the control systems on the throttle device side and vehicle side according to the second embodiment. In FIG. 14, the same members as members in the throttle device 100 according to the first embodiment are assigned by the same reference numerals. Configurations excluding the abnormality detector and the amplifiers are the same as the configurations of the control systems illustrated in FIG. 7. Accordingly, the configurations of the abnormality detector and the amplifiers are described here.

An abnormality detector 190 calculates an output difference between the Hall IC 160 and the Hall IC 170. The abnormality detector 190 stores a threshold that is similar to the threshold of the ECU according to the first embodiment. When the calculated output difference exceeds the threshold that is set in advance, the abnormality detector 190 outputs an abnormal signal.

When the abnormality detector 190 does not output the abnormal signal, amplifiers 167 and 177 respectively transmit the outputs of the Hall ICs 160 and 170 to the ECU 180. When the abnormality detector 190 outputs the abnormal signal, the amplifiers 167 and 177 reduce outputs to be transmitted from the Hall ICs 160 and 170 to the ECU 180, and set the outputs to be at the LOW level.

When the outputs of the Hall ICs 160 and 170 have been transmitted, the ECU 180 recognizes the grip position between the first position (the throttle is fully closed) and the second position (the throttle is fully open) on the basis of the outputs of the Hall ICs 160 and 170. When the outputs from both of the Hall ICs 160 and 170 are at the LOW level, the ECU 180 considers that the grip position is located in the first position. In the second embodiment, when the outputs of both of the Hall ICs 160 and 170 are at the LOW level, the ECU 180 considers that the grip position is located in the first position. However, the ECU 180 may consider that the grip position is located in the first position when the output of at least one of the Hall ICs 160 and 170 is at the LOW level.

(Operation of Throttle Device)

Figure 15:
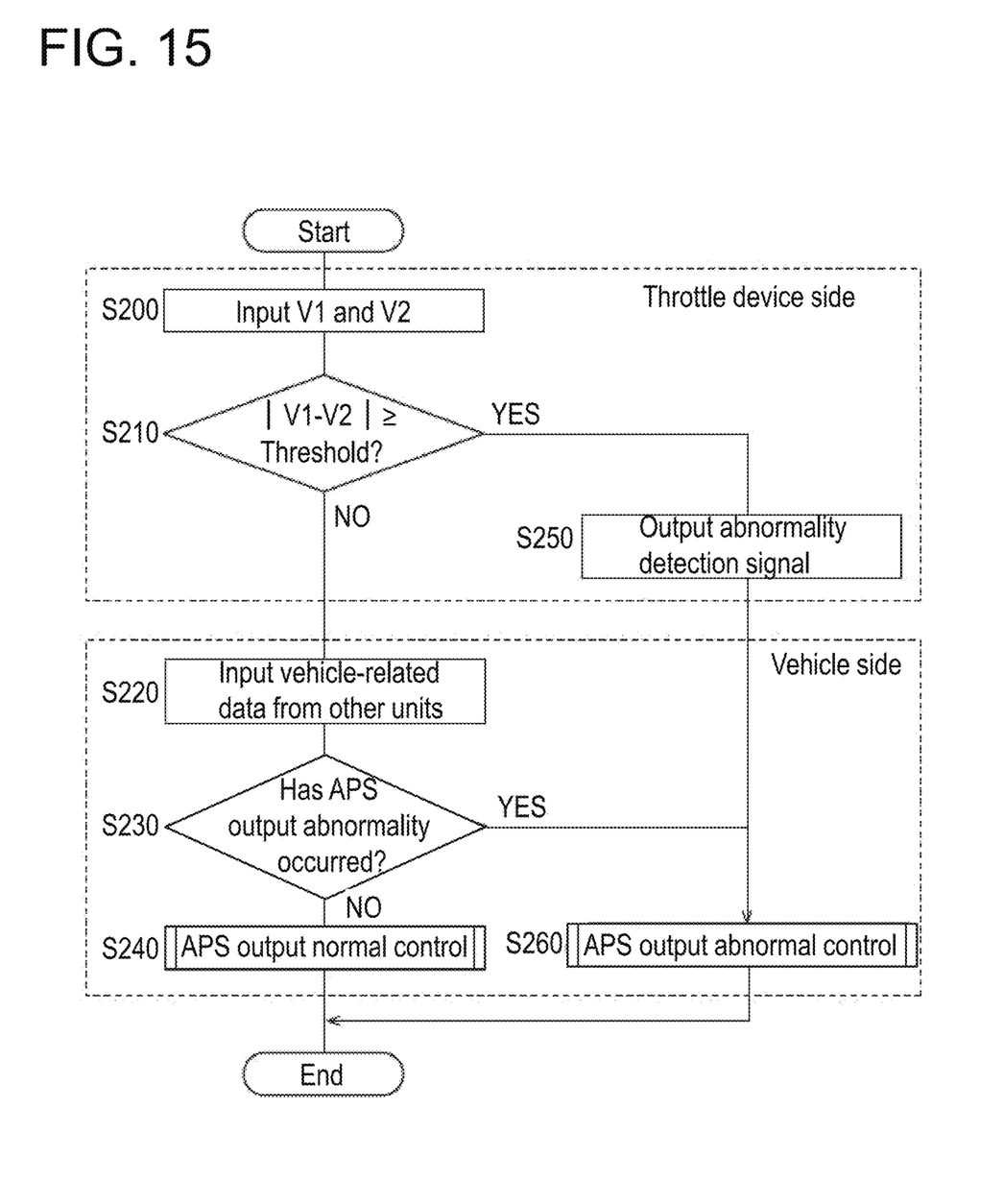
FIG. 15 is an operation flowchart of a substrate and the engine control unit (ECU) illustrated in FIG. 14.

FIG. 15 is an operation flowchart of the substrate and the engine control unit (ECU) illustrated in FIG. 14.

In this flowchart, three steps S200, S210, and S250 are processes performed by the abnormality detector 190, and four steps S220, S230, S240, and S260 are processes performed by the ECU 180.

First, V1 and V2 are input to the abnormality detector 190 from the Hall ICs 160 and 170, as illustrated in FIG. 14 (S200). The abnormality detector 190 calculates an absolute value of the difference between V1 and V2, and determines whether the absolute value is greater than or equal to the threshold (S210).

As a result of the determination above, when the absolute value is less than the threshold (S210: NO), the abnormality detector 190 does not output an abnormal signal, and vehicle-related data is input to the ECU 180 from other units (S220). For example, as the vehicle-related data, vehicle speed and other necessary vehicle signals are input to the ECU 180, as illustrated in FIG. 14.

The ECU 180 determines whether an accelerator position sensor (APS) output abnormality has occurred on the basis of each level of the vehicle speed and the other necessary vehicle signals that have been input (S230). When the APS output abnormality has not occurred (S230: NO), the ECU 180 performs the APS output normal control (S240). The APS output normal control is as described above with reference to the subroutine flowchart of FIG. 12.

In step S210, when it is determined that the absolute value of the difference between V1 and V2 is greater than or equal to the threshold (S210: YES), the abnormality detector 190 outputs an abnormality detection signal to the amplifiers 167 and 177. When the abnormality detection signal is output, the amplifiers 167 and 177 set outputs to be transmitted from the Hall ICs 160 and 170 to the ECU 180 to be at the LOW level, as illustrated in FIG. 14 (S250).

When the abnormality detection signal is output from the abnormality detector 190 (S250) or when it is determined in step S230 that the APS output abnormality has occurred (S230: YES), the ECU 180 performs the APS output abnormal control (S260). The APS output abnormal control is as described above with reference to the subroutine flowchart of FIG. 13.

As described above, in the second embodiment, when signals are input to the ECU 180 from the Hall ICs 160 and 170, the ECU 180 recognizes the grip position between the first position (the throttle is fully closed) and the second position (the throttle is fully open). When the outputs of both of the Hall ICs 160 and 170 are at the LOW level, the ECU 180 considers that the grip position is located in the first position.

As described above, in the throttle device 100 according to the second embodiment, the abnormality detector 190 is provided in the substrate 150, and therefore the abnormal detection of the throttle position can be sensed on the throttle device 100 side. Therefore, a program for the abnormal detection does not need to be installed in the ECU 180, and a processing load on the ECU 180 is reduced.

In addition, in the throttle device 100 according to the second embodiment, similarly to the first embodiment, in particular, when the throttle position is located in the first position, the erroneous detection of the grip position can be easily sensed, and the abnormal detection of the throttle opening can be reliably avoided.

The throttle device according to the present invention has been described above by using the first embodiment and the second embodiment. In the present invention, sensing of the erroneous detection of the throttle opening due to the influence of the disturbance magnetic field is realized by changing the disposition of the two Hall elements that are originally included in the throttle device. Thus, sensing of the erroneous detection of the grip position due to the disturbance magnetic field can be realized without increasing the number of parts or providing a special part.

In the present invention, a physical distance or a cover does not need to be provided in order to avoid the influence of the disturbance magnetic field. Thus, restrictions on the physical constitution of the throttle device can be eliminated, a degree of freedom in the design of the throttle device increases, and the size of the throttle device can be reduced.

The throttle device according to the present invention has been described above by using the first embodiment and the second embodiment. The throttle device according to the present invention is applicable to vehicles onto which an engine or a motor is mounted as motive power in addition to motorcycles.

What is claimed is:

1. A throttle device comprising:
   a rotating body that is rotatable between a first position and a second position with a rotating shaft as a center;
   a magnet that rotates integrally with the rotating body; and
   a substrate that includes a plurality of magnetic sensors and that is fixed to face the magnet, wherein:
the plurality of magnetic sensors are offset in a first direction intersecting with a second direction of a line of magnetic force of a magnetic field of the magnet in such a way that magnetic flux densities different from each other are respectively applied to the plurality of magnetic sensors when an external magnetic field acts in a state in which the rotating body is located in the first position;

disposing the plurality of magnetic sensors in such a way that magnetic flux densities different from each other are respectively applied to the plurality of magnetic sensors is mutually offsetting the plurality of magnetic sensors in two directions in such a way that magnetic fields having magnitudes different from each other are applied from the magnet to the plurality of magnetic sensors, the two directions being a first direction of a line of magnetic force of a magnetic field and a second direction intersecting the first direction; and offsetting the plurality of magnetic sensors in the first direction is disposing the plurality of magnetic sensors in positions different from each other on a plane of the substrate, and offsetting the plurality of magnetic sensors in the second direction is separately disposing the plurality of magnetic sensors on a front surface and a reverse surface of the substrate so that disposing the plurality of magnetic sensors in positions different from each other includes separating the plurality of magnetic sensors by using a thickness of the substrate.

2. The throttle device according to claim 1, wherein the substrate includes a plurality of integrated circuits that respectively include the plurality of magnetic sensors and that process outputs of the plurality of magnetic sensors, and the outputs of the plurality of magnetic sensors that have been processed by the plurality of integrated circuits are output to an engine control unit included in a vehicle.

3. The throttle device according to claim 2, wherein the engine control unit calculates an output difference between the plurality of integrated circuits, and when the output difference exceeds a threshold that is set in advance, the engine control unit considers that the rotating body is located in the first position.

4. The throttle device according to claim 2, wherein the substrates includes:
an abnormality detector that calculates the output difference between the plurality of integrated circuits, and outputs an abnormal signal when the output difference exceeds a threshold that is set in advance; and an amplifier that transmits an output of each of the plurality of integrated circuits to the engine control unit when the abnormality detector does not output the abnormal signal, and that reduces an output to be transmitted from at least one of the plurality of integrated circuits to the engine control unit and transmits the output when the abnormality detector outputs the abnormal signal.

5. The throttle device according to claim 4, wherein when outputs of the plurality of integrated circuits are transmitted, the engine control unit recognizes a position of the rotating body between the first position and the second position in accordance with the outputs of the plurality of integrated circuits, and when an output of at least one of the plurality of integrated circuits is reduced and transmitted, the engine control unit considers that the rotating body is located in the first position.

6. The throttle device according to claim 3, wherein the threshold is set to correspond to the position of the rotating body and to continuously or gradually increase according to a movement of the position from the first position to the second position in at least a portion of a section between the first position and the second position.

7. The throttle device according to claim 6, wherein the threshold has a minimum value when the rotating body is located in the first position.

8. The throttle device according to claim 1, wherein each of the plurality of magnetic sensors is one of a Hall element, a magnetoresistive element, a magnetic impedance element, and a superconductive quantum interference element.

9. The throttle device according to claim 1, wherein the rotating body is a grip, and
the first position is a grip position in which a throttle is fully closed, and the second position is a grip position in which the throttle is fully open.

* * * * *